US012792288B2

(12) United States Patent
Tseng et al.

(10) Patent No.: US 12,792,288 B2
(45) Date of Patent: Nov. 10, 2026

(54) SPLICING DISPLAY APPARATUS

(71) Applicant: AUO Corporation, Hsinchu City (TW)

(72) Inventors: Li Wei Tseng, Hsinchu City (TW); Chung Chuan Hsieh, Hsinchu City (TW); Cheng-Chuan Chen, Hsinchu City (TW); Shau-Yu Tsai, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/238,560

(22) Filed: Jun. 16, 2025

(65) Prior Publication Data

US 2025/0306839 A1 Oct. 2, 2025

Related U.S. Application Data

(63) Continuation of application No. 18/679,360, filed on May 30, 2024, now Pat. No. 12,393,388.

(30) Foreign Application Priority Data

Feb. 20, 2024 (TW) ................................ 113105912

(51) Int. Cl.

| | |
|---|---|
| ***G06F 3/14*** | (2006.01) |
| ***G02F 1/1333*** | (2006.01) |
| ***G02F 1/1337*** | (2006.01) |

(52) U.S. Cl.

CPC ........ *G06F 3/1446* (2013.01); *G02F 1/13336* (2013.01); *G02F 1/133757* (2021.01)

(58) Field of Classification Search

None

See application file for complete search history.

(56) References Cited

U.S. PATENT DOCUMENTS

2002/0180902 A1* 12/2002 Izumi .................. G02F 1/13336 257/E27.131
2019/0179591 A1* 6/2019 Kuo ...................... G06F 3/1446

FOREIGN PATENT DOCUMENTS

CN 115394207 11/2022

* cited by examiner

*Primary Examiner* — Carl Adams
(74) *Attorney, Agent, or Firm* — JCIPRNET

(57) ABSTRACT

Disclosed is a splicing display apparatus including display panels. Each of the display panels includes a circuit substrate and pixel units. The display panels include a first display panel and a second display panel arranged in a first direction and spliced to each other. The first display panel and the second display panel have a splicing seam. A pixel unit of the first display panel closest to the splicing seam is substantially aligned in the first direction with a pixel unit of the second display panel closest to the splicing seam. A color of a light beam emitted by a light-emitting element of the pixel unit of the first display panel closest to the splicing seam is the same color as a color of a light beam emitted by a light-emitting element of the pixel unit of the second display panel closest to the splicing seam.

13 Claims, 10 Drawing Sheets

SPLICING DISPLAY APPARATUS

CROSS-REFERENCE TO RELATED APPLICATION

This application is a continuation application of and claims the priority benefit of U.S. application Ser. No. 18/679,360, filed on May 30, 2024, which claims the priority benefit of Taiwan application serial no. 113105912, filed on Feb. 20, 2024. The entirety of each of the above-mentioned patent applications is hereby incorporated by reference herein and made a part of this specification.

BACKGROUND

Technical Field

The disclosure relates to a display apparatus, and in particular to a splicing display apparatus.

Description of Related Art

As the use of display apparatus diversifies, large display boards used to present public information or advertisements have become increasingly common in exhibition halls or department stores. To reduce the disposition and maintenance costs of large display boards, splicing display apparatus made of multiple spliced display panels have become one of the common options for setting up the large display boards. Generally, during the splicing process, display panels (such as LED panels) cannot be tightly arranged due to splicing precision issues, which easily results in splicing seams between the display panels. A part of a color light emitted by a light-emitting element close to the splicing seam is totally reflected at the seam, causing the color light emitted by the light-emitting element to predominantly travel in one direction, further leading to color casts of the splicing display apparatus at a large viewing angle.

SUMMARY

The disclosure provides a splicing display apparatus with good optical performance.

The splicing display apparatus of the disclosure includes multiple display panels. Each of the display panels includes a circuit substrate and pixel units. The pixel units are arranged in an array on the circuit substrate and electrically connected to the circuit substrate. Each of the pixel units includes multiple light-emitting elements. The display panels include a first display panel and a second display panel arranged in a first direction and spliced to each other. The first display panel and the second display panel have a splicing seam. A pixel unit of the first display panel closest to the splicing seam is substantially aligned in the first direction with a pixel unit of the second display panel closest to the splicing seam. A color of a light beam emitted by a light-emitting element of the pixel unit of the first display panel closest to the splicing seam is the same color as a color of a light beam emitted by a light-emitting element of the pixel unit of the second display panel closest to the splicing seam.

DESCRIPTION OF THE EMBODIMENTS

Figure 1:
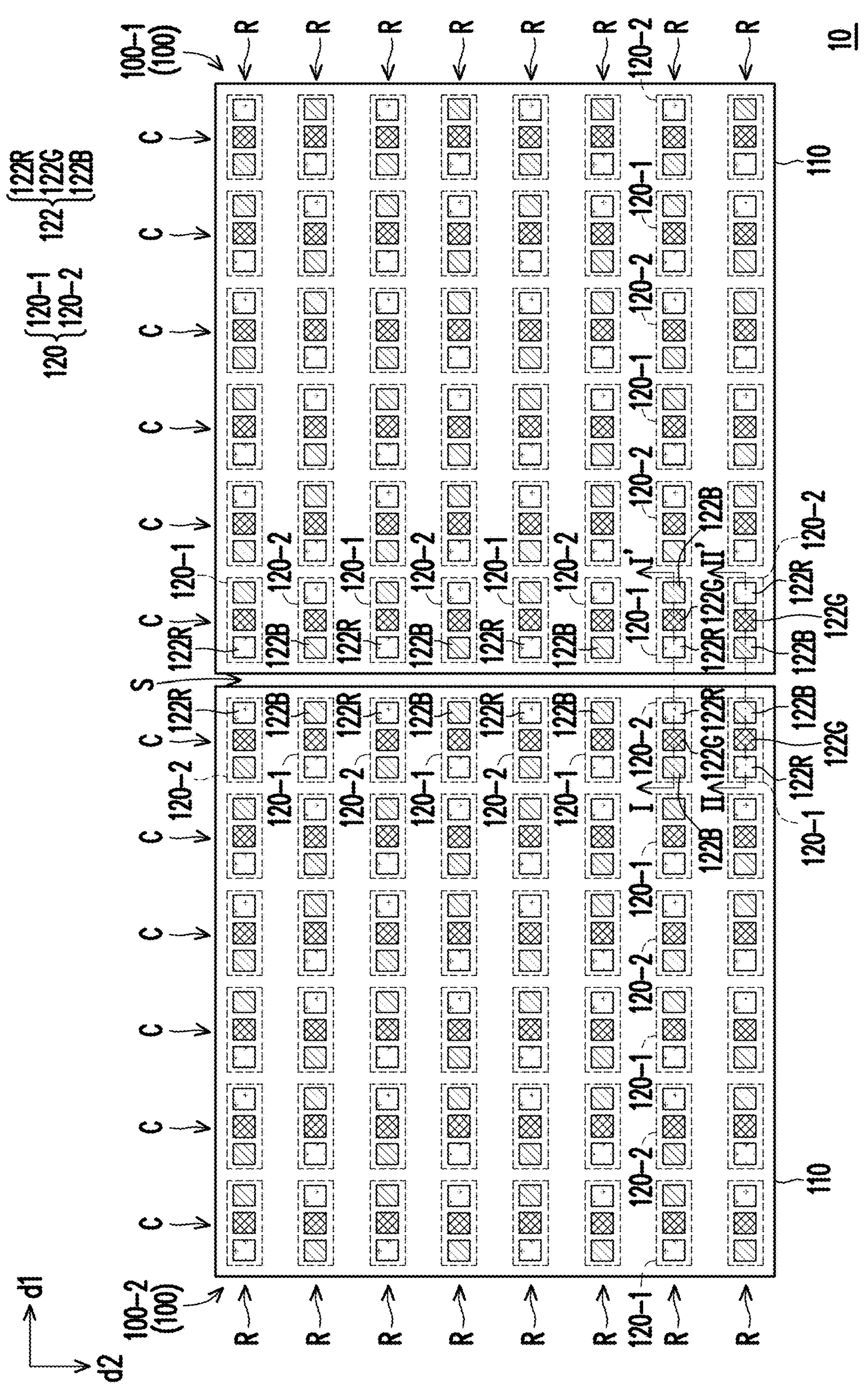
FIG. 1 is a schematic top view of a splicing display apparatus in an embodiment of the disclosure.

Reference will now be made in detail to the exemplary embodiments of the present invention, examples of which are illustrated in the accompanying drawings. Wherever possible, the same reference numbers are used in the drawings and the description to refer to the same or like parts.

It should be understood that when an element such as a layer, film, region, or substrate is referred to as being "on" or "connected to" another element, it can be directly on or connected to the other element, or Intermediate elements may also be present. In contrast, when an element is referred to as being "directly on" or "directly connected to" another element, there are no intervening elements. As used herein, "connection" can refer to physical and/or electrical connection. Furthermore, "electrical connection" or "coupling" can mean that there are other elements between two elements.

As used herein, "about", "approximately", or "substantially" includes the stated value and the average value within the acceptable deviation range of the specific value determined by a person of ordinary skill in the art, taking into account the measurement in question and a certain amount of measurement-related error (i.e., the limitation of the measurement system). For example, "about" can mean within one or more standard deviations of the stated value, or within ±30%, ±20%, ±10%, ±5%. Furthermore, "about", "approximate" or "substantially" used herein can be based on optical properties, etching properties or other properties to select a more acceptable range of deviation or standard deviation, and not one standard deviation can be applied to all properties.

Unless otherwise defined, all terms (including technical and scientific terms) used herein have the same meaning as commonly understood by those of ordinary skill in the art to which the disclosure belongs. It will be further understood that terms such as those defined in commonly used dictionaries should be interpreted as having meanings consistent with the relevant art and the background or context of the disclosure, and should not be interpreted in an idealized or overly formal way, unless otherwise defined in the embodiments of the disclosure.

Figure 2:
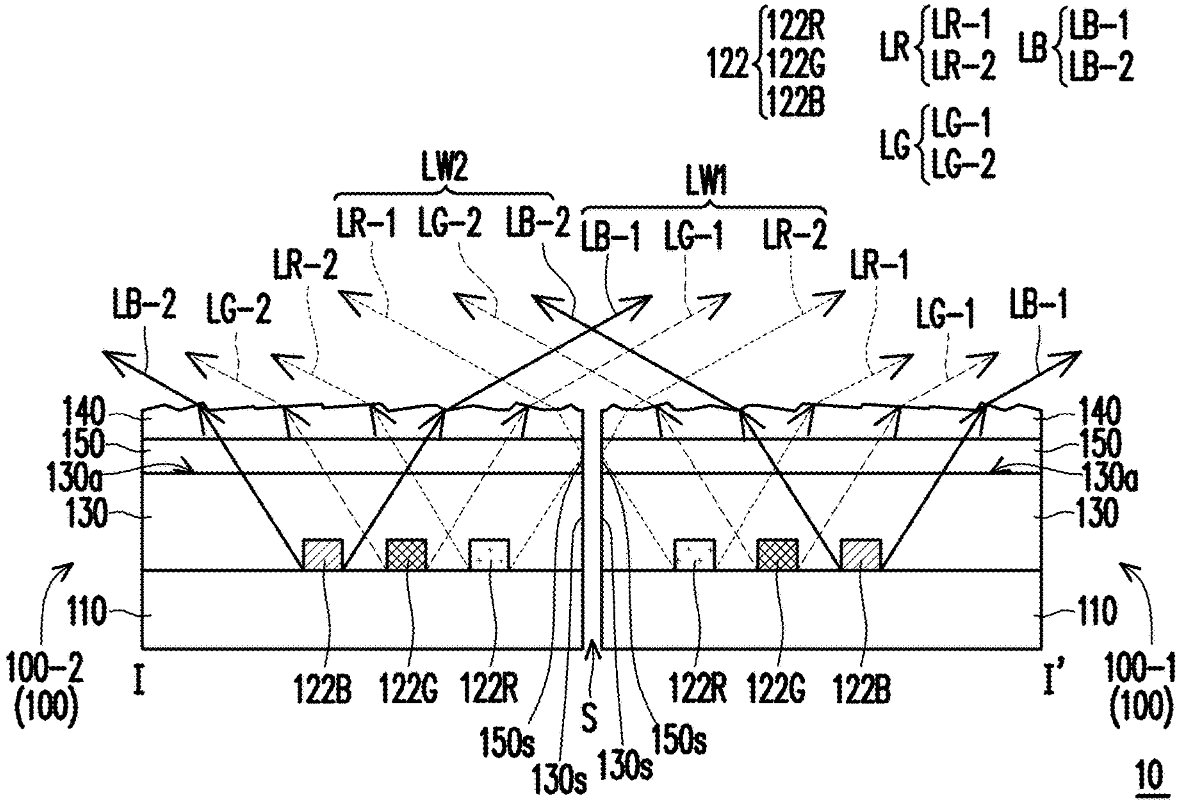
FIG. 2 is a schematic cross-sectional view of a splicing display apparatus in an embodiment of the disclosure.
Figure 3:
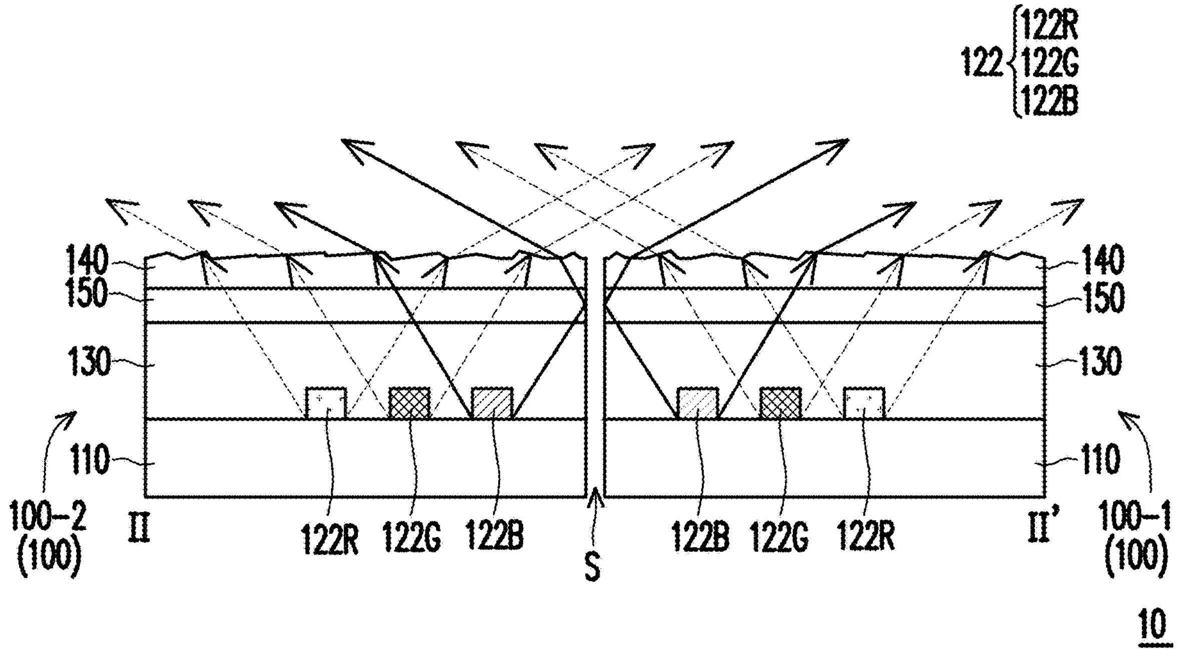
FIG. 3 is a schematic cross-sectional view of a splicing display apparatus in an embodiment of the disclosure.

FIG. 1 is a schematic top view of a splicing display apparatus in an embodiment of the disclosure. FIG. 2 is a schematic cross-sectional view of a splicing display apparatus in an embodiment of the disclosure. FIG. 2 corresponds to a cross-sectional line I-I' in FIG. 1. FIG. 3 is a schematic cross-sectional view of a splicing display apparatus in an embodiment of the disclosure. FIG. 3 corresponds to a cross-sectional line II-II' in FIG. 1. An optical film 140 and an optical clear adhesive 150 in FIGS. 2 and 3 are omitted in FIG. 1.

Referring to FIGS. 1, 2, and 3, a splicing display apparatus 10 includes multiple display panels 100 spliced to each other. Each of the display panels 100 includes a circuit substrate 110 and multiple pixel units 120. In an embodiment, the circuit substrate 110 is, for example, a printed circuit board, but the disclosure is not limited thereto. The pixel units 120 are arranged in arrays on the circuit substrate 110 and electrically connected to the circuit substrate 110. Each of the pixel units 120 includes multiple light-emitting elements 122. For example, in an embodiment, the light-emitting elements 122 of each pixel unit 120 include a first light-emitting element 122R, a second light-emitting element 122B, and a third light-emitting element 122G. The first light-emitting element 122R, the second light-emitting element 122B, and the third light-emitting element 122G are used to emit a first color light LR, a second color light LB, and a third color light LG respectively. In an embodiment, the first color light LR, the second color light LB, and the third color light LG are, for example, red light, blue light, and green light respectively, but the disclosure is not limited thereto. In an embodiment, each light-emitting element 122 is, for example, a micro light-emitting diode (μLED), but the disclosure is not limited thereto.

Referring to FIGS. 2 and 3, in an embodiment, each display panel 100 further includes an encapsulation layer 130, disposed on the circuit substrate 110 and covering the pixel units 120. In an embodiment, the encapsulation layer 130 directly covers the light-emitting elements 122 of the pixel units 120. However, the disclosure is not limited thereto. In other embodiments, each display panel 100 may selectively include multiple package structures (not shown) separated from each other, wherein each package structure covers the light-emitting elements 122 of a corresponding pixel unit 120, and each package structure forms a light-emitting element package with the light-emitting elements 122 of the pixel unit covered by the package structure. The encapsulation layer 130 may cover multiple light-emitting element package without directly contacting the light-emitting elements 122R, 122G, and 122B.

In an embodiment, each display panel 100 may further selectively include an optical film 140. The optical film 140 is disposed on the encapsulation layer 130, and the pixel units 120 are located between the optical film 140 and the circuit substrate 110. The optical film 140 is used to reduce reflection and enhance contrast. For example, in an embodiment, the optical film 140 may be a true black film, but the disclosure is not limited thereto. In an embodiment, each display panel 100 may further selectively include an optical clear adhesive 150, wherein the optical film 140 is adhered to the encapsulation layer 130 through the optical clear adhesive 150. For example, in an embodiment, the optical clear adhesive 150 is, for example, black optical clear adhesive, but the disclosure is not limited thereto.

Referring to FIGS. 1 and 2, the display panels 100 of the splicing display apparatus 10 include a first display panel 100-1 and a second display panel 100-2 arranged in a first direction d1 and spliced to each other. The first display panel 100-1 and the second display panel 100-2 have a splicing seam S. A pixel unit 120 of the first display panel 100-1 closest to the splicing seam S is substantially aligned in the first direction d1 with a pixel unit 120 of the second display panel 100-2 closest to the splicing seam S. The color of a light beam emitted by a light-emitting element 122 of the pixel unit 120 of the first display panel 100-1 closest to the splicing seam S is the same as the color of a light beam emitted by a light-emitting element 122 of the pixel unit 120 of the second display panel 100-2 closest to the splicing seam S.

Referring to FIGS. 1 and 2, for example, in an embodiment, a pixel unit 120 of the first display panel 100-1 closest to the splicing seam S is substantially aligned in the first direction d1 with a pixel unit 120 of the second display panel 100-2 closest to the splicing seam S. Both the color of a light beam (e.g., the first color light LR) emitted by a first light-emitting element 122R of the pixel unit 120 of the first display panel 100-1 closest to the splicing seam S and the color of a light beam (e.g., the first color light LR) emitted by a first light-emitting element 122R of the pixel unit 120 of the second display panel 100-2 closest to the splicing seam S may be red, but the disclosure is not limited thereto.

Referring to FIGS. 1 and 3, for example, in an embodiment, a pixel unit 120 of the first display panel 100-1 closest to the splicing seam S is substantially aligned in the first direction d1 with a pixel unit 120 of the second display panel 100-2 closest to the splicing seam S. Both the color of a light beam (e.g., the second color light LB) emitted by a second light-emitting element 122B of the pixel unit 120 of the first display panel 100-1 closest to the splicing seam S and the color of a light beam (e.g., the second color light LB) emitted by a second light-emitting element 122B of the pixel unit 120 of the second display panel 100-2 closest to the splicing seam S may be blue, but the disclosure is not limited thereto.

Referring to FIGS. 1 and 2, in an embodiment, a pixel unit 120 of the first display panel 100-1 closest to the splicing seam S is substantially aligned in the first direction d1 with a pixel unit 120 of the second display panel 100-2 closest to the splicing seam S. The first light-emitting element 122R, the third light-emitting element 122G, and the second light-emitting element 122B of the pixel unit 120 of the first display panel 100-1 closest to the splicing seam S are sequentially arranged in the first direction d1. The second light-emitting element 122B, the third light-emitting element 122G, and the first light-emitting element 122R of the pixel unit 120 of the second display panel 100-2 closest to the splicing seam S are sequentially arranged in the first direction d1.

Referring to FIGS. 1 and 3, in an embodiment, a pixel unit 120 of the first display panel 100-1 closest to the splicing seam S is substantially aligned in the first direction d1 with a pixel unit 120 of the second display panel 100-2 closest to the splicing seam S. The second light-emitting element 122B, the third light-emitting element 122G, and the first light-emitting element 122R of the pixel unit 120 of the first display panel 100-1 closest to the splicing seam S are sequentially arranged in the first direction d1. The first light-emitting element 122R, the third light-emitting element 122G, and the second light-emitting element 122B of the pixel unit 120 of the second display panel 100-2 closest to the splicing seam S are sequentially arranged in the first direction d1.

Referring to FIGS. 1 and 2, it is worth mentioning that, by configuring the light-emitting elements 122 of the pixel units 120 of the first display panel 100-1 and the second display panel 100-2 closest to the splicing seam S through the above arrangement methods, a part of the light beams emitted by a part of the light-emitting elements 122 of the pixel unit 120 of the first display panel 100-1 closest to the splicing seam S may be mixed with a part of the light beams emitted by a part of the light-emitting elements 122 of the pixel unit 120 of the second display panel 100-2 closest to the splicing seam S, further making improvements in terms of color casts at the splicing seam S of the splicing display apparatus 10 at a large viewing angle.

Referring to FIGS. 1 and 2, for example, in an embodiment, the light beam LR emitted by the first light-emitting element 122R of a pixel unit 120 of the first display panel 100-1 closest to the splicing seam S includes a first part LR-1 and a second part LR-2, which are transmitted towards the right side and the left side respectively, in the encapsulation layer 130. The first part LR-1, after emerging from a top surface 130*a* of the encapsulation layer 130, travels at a large viewing angle on the right side while the second part LR-2, only after being totally reflected at the seam S, emerges from the top surface 130*a* of the encapsulation layer 130 and travels at the large viewing angle on the right side. The light beam LG emitted by the third light-emitting element 122G of a pixel unit 120 of the first display panel 100-1 closest to the splicing seam S includes a first part LG-1 and a second part LG-2, which are transmitted towards the right side and the left side respectively, in the encapsulation layer 130. The first part LG-1, after emerging from the top surface 130*a* of the encapsulation layer 130, travels at the large viewing angle on the right side while the second part LG-2, after emerging from the top surface 130*a* of the encapsulation layer 130, travels at a large viewing angle on the left side. The light beam LB emitted by the second light-emitting element 122B of a pixel unit 120 of the first display panel 100-1 closest to the splicing seam S includes a first part LB-1 and a second part LB-2, which are transmitted towards the right side and the left side respectively, in the encapsulation layer 130. The first part LB-1, after emerging from the top surface 130*a* of the encapsulation layer 130, travels at the large viewing angle on the right side while the second part LB-2, after emerging from the top surface 130*a* of the encapsulation layer 130, travels at the large viewing angle on the left side. The light beam LR emitted by the first light-emitting element 122R of a pixel unit 120 of the second display panel 100-2 closest to the splicing seam S includes a first part LR-1 and a second part LR-2, which are transmitted towards the right side and the left side respectively, in the encapsulation layer 130. The first part LR-1, only after being totally reflected at the seam S, emerges from the top surface 130*a* of the encapsulation layer 130 and travels at a large viewing angle on the left side while the second part LR-2, after emerging from the top surface 130*a* of the encapsulation layer 130, travels at the large viewing angle on the left side. The light beam LG emitted by the third light-emitting element 122G of a pixel unit 120 of the second display panel 100-2 closest to the splicing seam S includes a first part LG-1 and a second part LG-2, which are transmitted towards the right side and the left side respectively, in the encapsulation layer 130. The first part LG-1, after emerging from the top surface 130*a* of the encapsulation layer 130, travels at a large viewing angle on the right side while the second part LG-2, after emerging from the top surface 130*a* of the encapsulation layer 130, travels at the large viewing angle on the left side. The light beam LB emitted by the second light-emitting element 122B of a pixel unit 120 of the second display panel 100-2 closest to the splicing seam S includes a first part LB-1 and a second part LB-2, which are transmitted towards the right side and the left side respectively, in the encapsulation layer 130. The first part LB-1, after emerging from the top surface 130*a* of the encapsulation layer 130, travels at the large viewing angle on the right side while the second part LB-2, after emerging from the top surface 130*a* of the encapsulation layer 130, travels at the large viewing angle on the left side.

Particularly, the second part LR-2 of the light beam LR emitted by the first light-emitting element 122R of the pixel unit 120 of the first display panel 100-1 closest to the splicing seam S travels at the large viewing angle on the right side after emergent. The first part LG-1 of the light beam LR emitted by the third light-emitting element 122G of the pixel unit 120 of the second display panel 100-2 closest to the splicing seam S travels at the large viewing angle on the right side after emergent. The first part LB-1 of the light beam LB emitted by the second light-emitting element 122B of the pixel unit 120 of the second display panel 100-2 closest to the splicing seam S also travels at the large viewing angle on the right side after emergent. The three parts are mixed together at the large viewing angle on the right side and form a white light LW1, thereby making improvements in terms of color casts on the right side.

Similarly, the first part LR-1 of the light beam LR emitted by the first light-emitting element 122R of the pixel unit 120 of the second display panel 100-2 closest to the splicing seam S travels at the large viewing angle on the left side after emergent. The second part LG-2 of the light beam LR emitted by the third light-emitting element 122G of the pixel unit 120 of the first display panel 100-1 closest to the splicing seam S travels at the large viewing angle on the left side after emergent. The second part LB-2 of the light beam LB emitted by the second light-emitting element 122B of the pixel unit 120 of the first display panel 100-2 closest to the splicing seam S also travels at the large viewing angle on the left side after emergent. The three parts are mixed together at the large viewing angle on the left side and form a white light LW2, thereby making improvements in terms of color casts on the left side.

It is noted that in the embodiment shown in FIG. 2, the second part LR-2 of the light beam LR provided by the first display panel 100-1 and the first part LR-1 of the light beam LR provided by the second display panel 100-2 occur as examples on a side wall 150*s* of the optical clear adhesive 150 defining the splicing seam S. However, the disclosure is not limited thereto. In another embodiment, when the encapsulation layer 130 is thicker, the total reflection phenomenon may also occur on a side wall 130*s* of the encapsulation layer 130 defining the splicing seam S. In other words, the total reflection phenomenon at the splicing seam S not only occurs on the display panel 100 that includes the encapsulation layer 130, the optical clear adhesive 150, and the optical film 140. The total reflection phenomenon at the splicing seam S may also occur on a display panel that includes the encapsulation layer 130 but without the optical clear adhesive 150 and the optical film 140. The total reflection phenomenon at the splicing seam S may also occur on a display panel that includes the optical film 140 directly attached to the light-emitting element 122 but without the encapsulation layer 130. In short, wherever an optical layer of certain thickness is shown the light-emitting element 122 of the display panel 100, the total reflection phenomenon may occur at the splicing seam S of any of the display panels 100 regardless of the type of optical layer.

Referring to FIG. 1, the pixel units 120 of each display panel 100 are arranged into multiple pixel unit rows R and multiple pixel unit columns C. The pixel units 120 in each pixel unit row R are arranged in the first direction d1, and the pixel units 120 in each pixel unit column C are arranged in a second direction d2. The first direction d1 intersects the second direction d2.

In an embodiment, the first display panel 100-1 includes a pixel unit column C closest to the splicing seam S. The light-emitting elements 122 of the pixel units 120 in the pixel unit column C of the first display panel 100-1 closest to the splicing seam S include multiple first light-emitting elements 122R and multiple second light-emitting elements 122B alternately arranged in the second direction d2. The second display panel 100-2 includes a pixel unit column C closest to the splicing seam S. The pixel unit column C of the second display panel 100-2 includes multiple pixel units 120 arranged in the second direction d2. The light-emitting elements 122 of the pixel units 120 in the pixel unit column C of the second display panel 100-2 closest to the splicing seam S include multiple first light-emitting elements 122R and multiple second light-emitting elements 122B alternately arranged in the second direction d2. The first light-emitting elements 122R of the first display panel 100-1 are substantially aligned in the first direction d1 with the first light-emitting elements 122R of the second display panel 100-2 respectively, and the second light-emitting elements 122B of the first display panel 100-1 are substantially aligned in the first direction d1 with the second light-emitting elements 122B of the second display panel 100-2 respectively.

Referring to FIGS. 1, 2, and 3, in short, in an embodiment, a column of light-emitting elements 122 of each of the first display panel 100-1 and the second display panel 100-2 closest to the splicing seam S includes multiple first light-emitting elements 122R and multiple second light-emitting elements 122B that emit light beams of different colors (e.g., the first color light LR and the second color light LB) and are alternately arranged. Moreover, in the same column, the color of a light beam (e.g., the first color light LR or the second color light LB) emitted by a light-emitting element 122 of the first display panel 100-1 closest to the splicing seam S is the same as the color of a light beam (e.g., the first color light LR or the second color light LB) emitted by a light-emitting element 122 of the second display panel 100-2 closest to the splicing seam S.

Referring to FIG. 1, based on an arrangement order of the first light-emitting element 122R, the second light-emitting element 122B, and the third light-emitting element 122G of a pixel unit 120, in an embodiment, the pixel units 120 may be divided into multiple first pixel units 120-1 and multiple second pixel units 120-2. A first light-emitting element 122R, a third light-emitting element 122G, and a second light-emitting element 122B of each first pixel unit 120-1 are sequentially arranged in the first direction d1, and a second light-emitting element 122B, a third light-emitting element 122G, and a first light-emitting element 122R of each second pixel unit 120-2 are sequentially arranged in the first direction d1.

In an embodiment, the first display panel 100-1 includes a pixel unit column C closest to the splicing seam S. Multiple first pixel units 120-1 and multiple second pixel units 120-2 in the pixel unit column C of the first display panel 100-1 are alternately arranged in the second direction d2. The second display panel 100-2 includes a pixel unit column C closest to the splicing seam S. Multiple first pixel units 120-1 and multiple second pixel units 120-2 in the pixel unit column C of the second display panel 100-2 are alternately arranged in the second direction d2. The first pixel units 120-1 in the pixel unit column C of the first display panel 100-1 are substantially aligned in the first direction d1 with the second pixel units 120-2 in the pixel unit column C of the second display panel 100-2, and the second pixel units 120-2 in the pixel unit column C of the first display panel 100-1 are substantially aligned in the first direction d1 with the first pixel units 120-1 in the pixel unit column C of the second display panel 100-2.

Figure 4:
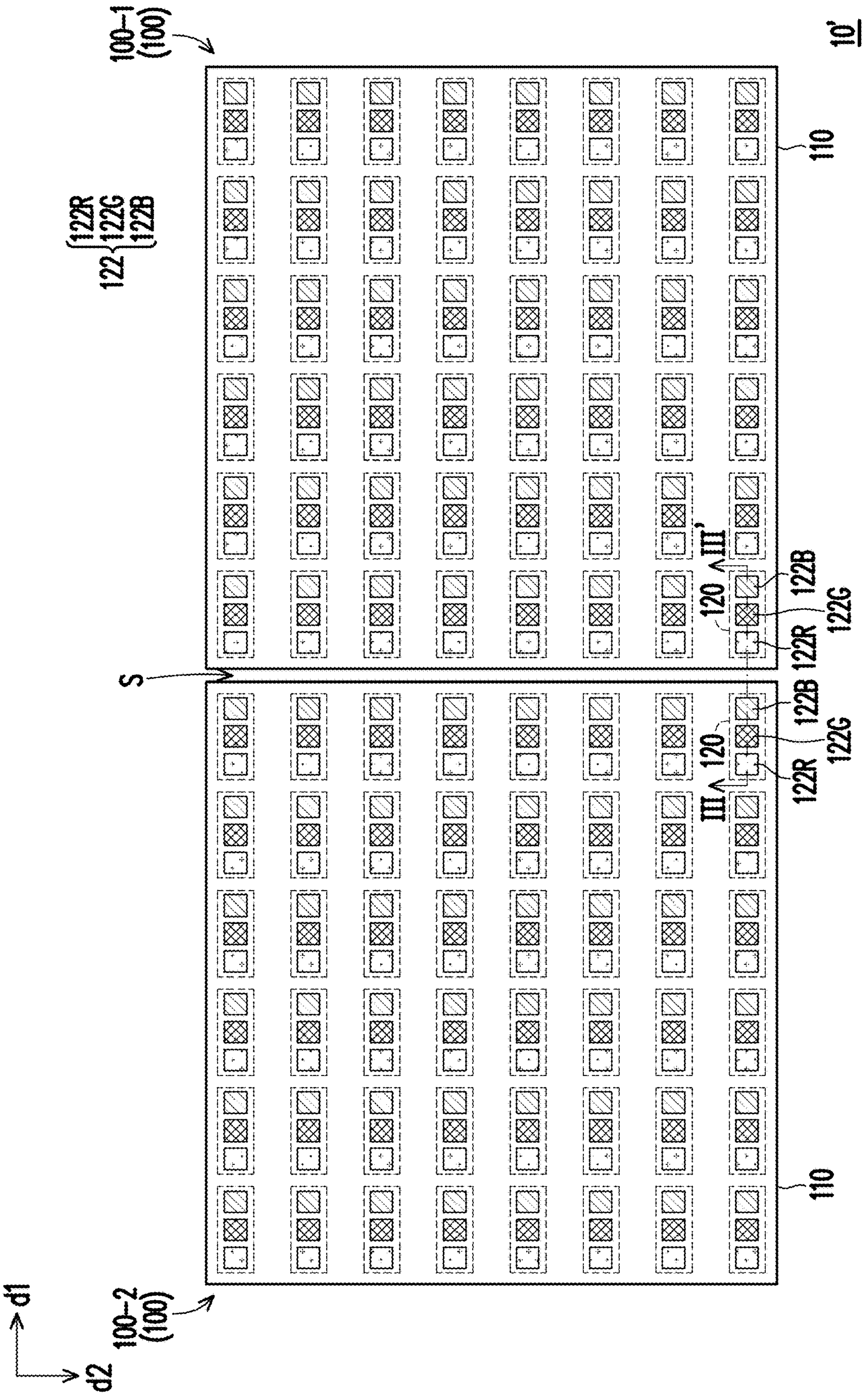
FIG. 4 is a schematic top view of a splicing display apparatus in a comparative example.
Figure 5:
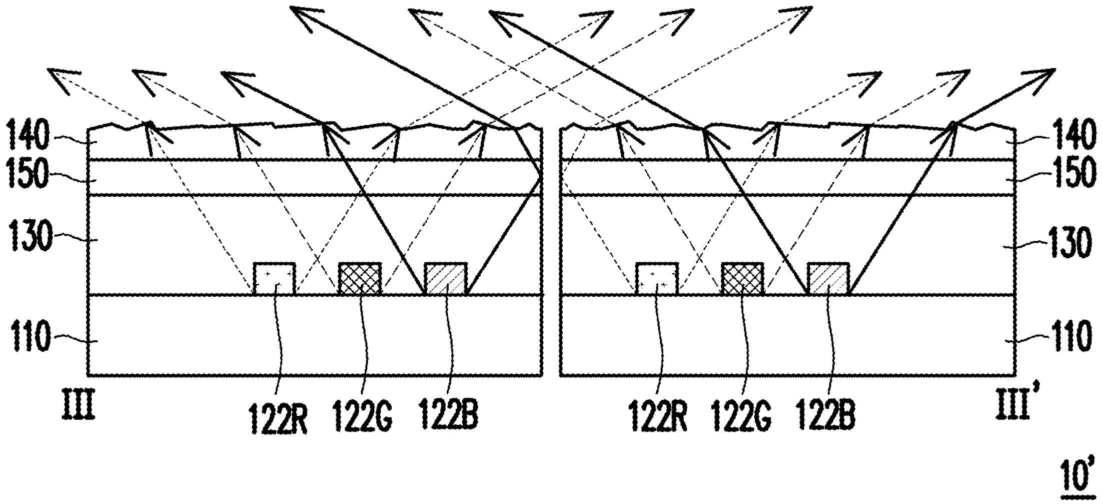
FIG. 5 is a schematic cross-sectional view of a splicing display apparatus in a comparative example.

FIG. 4 is a schematic top view of a splicing display apparatus in a comparative example. FIG. 5 is a schematic cross-sectional view of a splicing display apparatus in a comparative example. FIG. 5 corresponds to a cross-sectional line III-III' in FIG. 1. The optical film 140 and the optical clear adhesive 150 in FIG. 5 are omitted in FIG. 4.

Referring to FIGS. 4 and 5, a splicing display apparatus 10' in the comparative example is similar to the splicing display apparatus 10. The difference between the splicing display apparatus 10' and the splicing display apparatus 10 is that the light-emitting elements 122 of each pixel unit 120 of splicing display apparatus 10' are arranged in the same way. Specifically, in the comparative examples shown in FIGS. 4 and 5, the first light-emitting element 122R, the third light-emitting element 122G, and the second light-emitting element 122B of each pixel unit 120 are sequentially arranged in the first direction d1.

Figure 6:
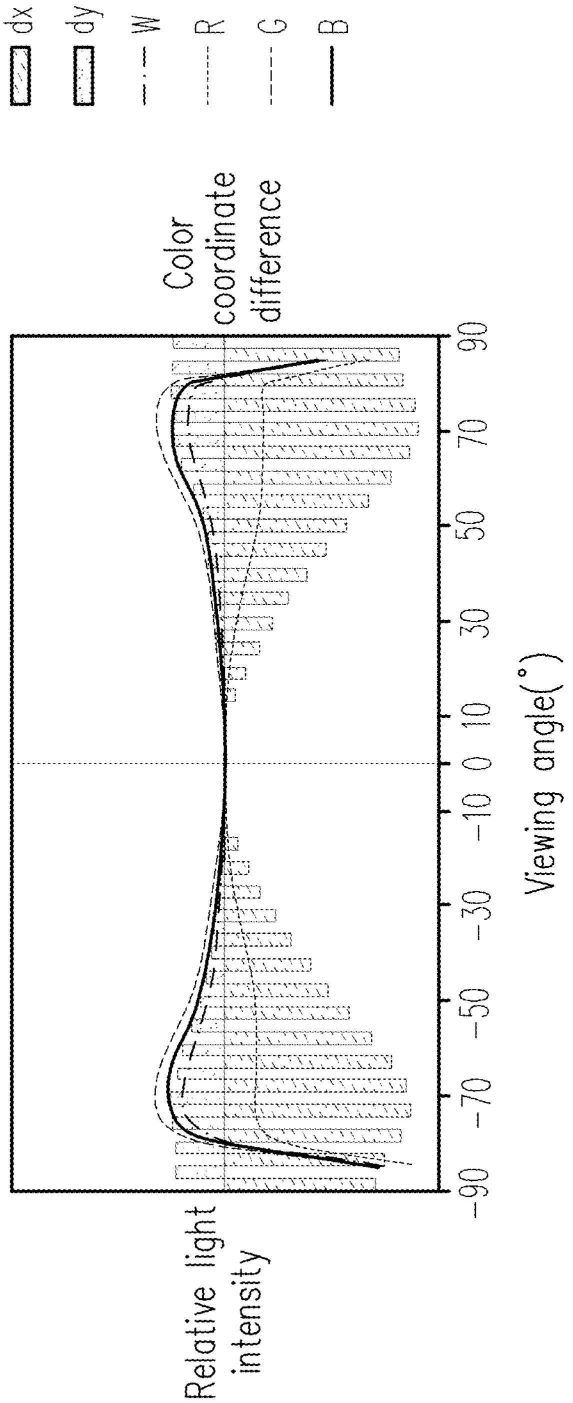
FIG. 6 shows the relative light intensities and color coordinate differences of light beams in various colors of a splicing display apparatus at different viewing angles in a second direction d2 in an embodiment of the disclosure.

FIG. 6 shows the relative light intensities and color coordinate differences of light beams in various colors of a splicing display apparatus at different viewing angles in a second direction d2 in an embodiment of the disclosure. Curve R represents the relative light intensity of red light beams of the splicing display apparatus 10 at different viewing angles in the second direction d2. Curve G represents the relative light intensity of green light beams of the splicing display apparatus 10 at different viewing angles in the second direction d2. Curve B represents the relative light intensity of blue light beams of the splicing display apparatus 10 at different viewing angles in the second direction d2. Bar Chart dx represents the differences in x color coordinates of the splicing display apparatus 10 at different viewing angles in the second direction d2, and Bar Chart dy represents the differences in y color coordinates of the splicing display apparatus 10 at different viewing angles in the second direction d2.

Figure 7:
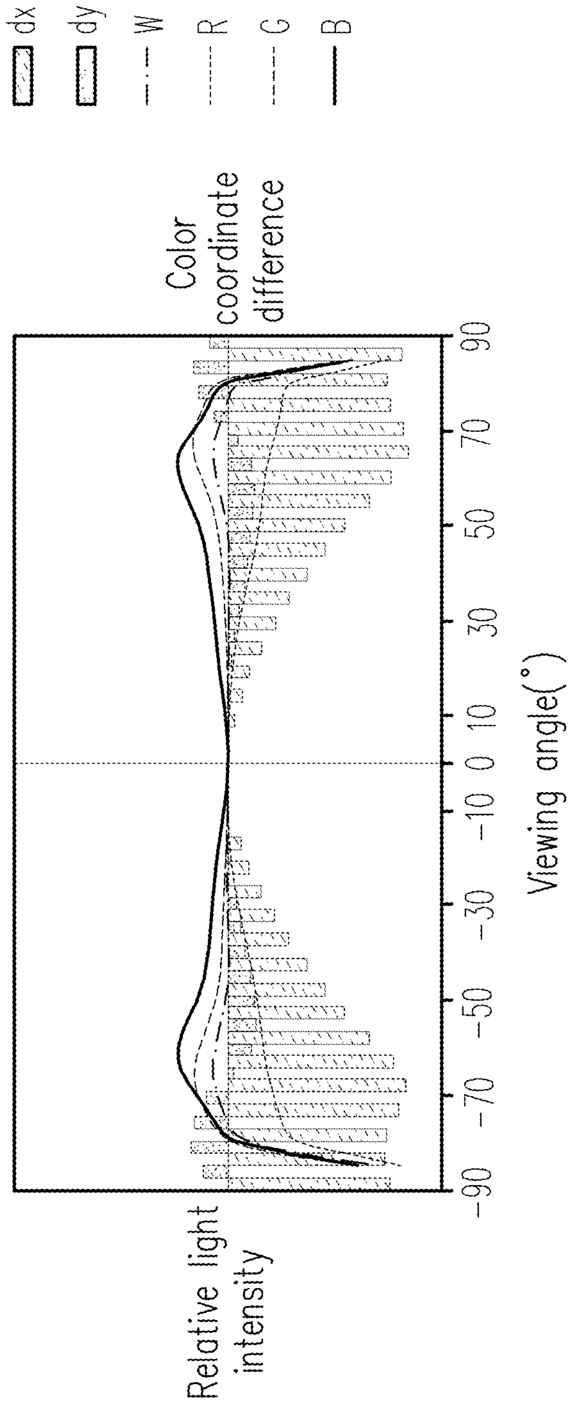
FIG. 7 shows the relative light intensities and color coordinate differences of light beams in various colors of a splicing display apparatus at different viewing angles in a first direction d1 in an embodiment of the disclosure.

FIG. 7 shows the relative light intensities and color coordinate differences of light beams in various colors of a splicing display apparatus at different viewing angles in a first direction d1 in an embodiment of the disclosure. Curve R represents the relative light intensity of the red light beams of the splicing display apparatus 10 at different viewing angles in the first direction d1. Curve G represents the relative light intensity of the green light beams of the splicing display apparatus 10 at different viewing angles in the first direction d1. Curve B represents the relative light intensity of the blue light beams of the splicing display apparatus 10 at different viewing angles in the first direction d1. Bar Chart dx represents the differences in the x color coordinates of the splicing display apparatus 10 at different viewing angles in the first direction d1, and Bar Chart dy represents the differences in the y color coordinates of the splicing display apparatus 10 at different viewing angles in the first direction d1.

Figure 8:
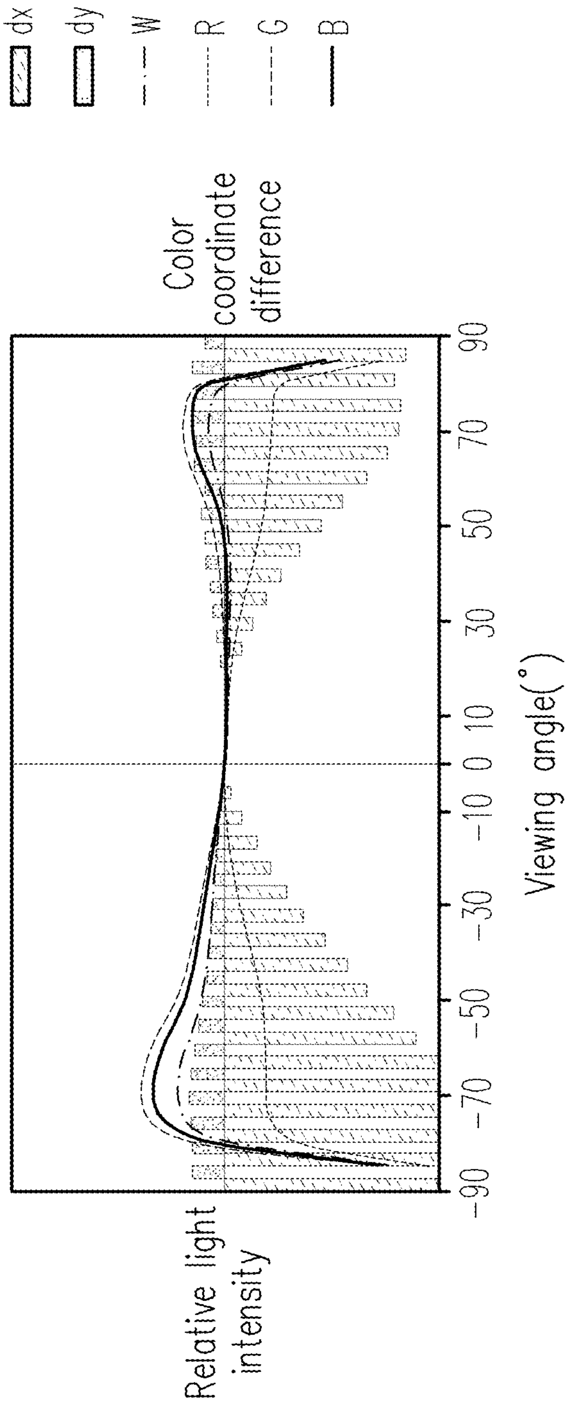
FIG. 8 shows the relative light intensities and color coordinate differences of light beams in various colors of a splicing display apparatus at different viewing angles in a second direction d2 in a comparative example.

FIG. 8 shows the relative light intensities and color coordinate differences of light beams in various colors of the splicing display apparatus 10' at different viewing angles in a second direction d2 in a comparative example. Curve R represents the relative light intensity of red light beams of the splicing display apparatus 10' at different viewing angles in the second direction d2. Curve G represents the relative light intensity of green light beams of the splicing display apparatus 10' at different viewing angles in the second direction d2. Curve B represents the relative light intensity of blue light beams of the splicing display apparatus 10' at different viewing angles in the second direction d2. Bar Chart dx represents the differences in x color coordinates of the splicing display apparatus 10' at different viewing angles in the second direction d2, and Bar Chart dy represents the differences in y color coordinates of the splicing display apparatus 10' at different viewing angles in the second direction d2.

Figure 9:
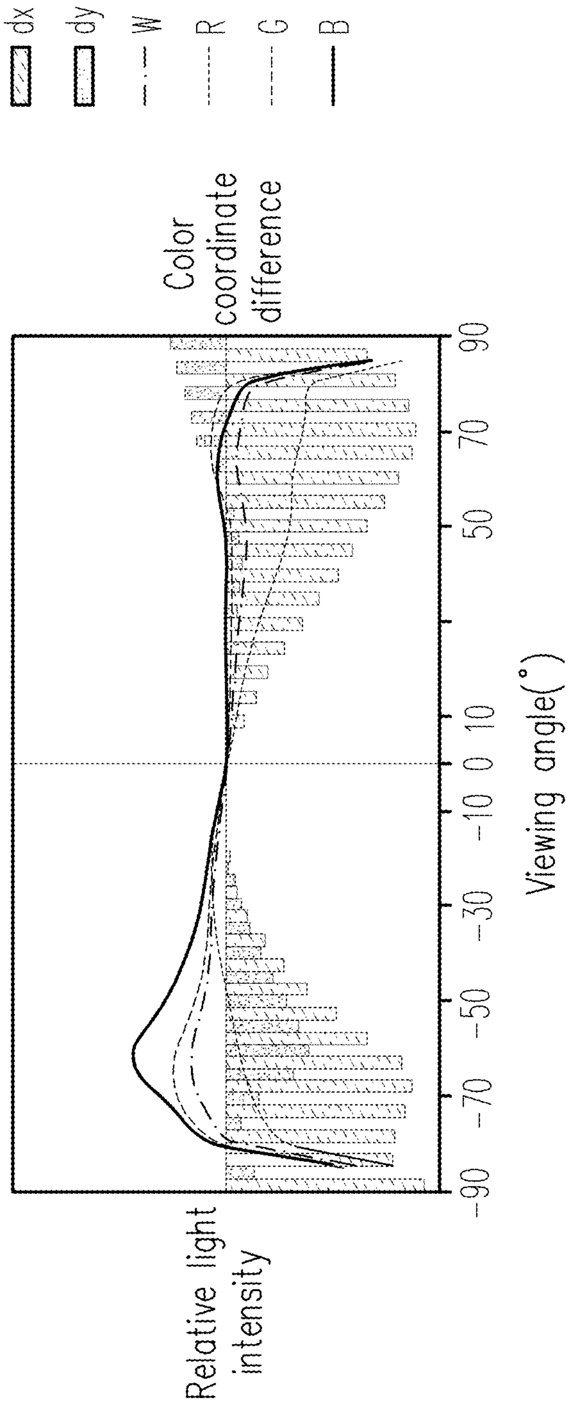
FIG. 9 shows the relative light intensities and color coordinate differences of light beams in various colors of a splicing display apparatus at different viewing angles in a first direction d1 in a comparative example.

FIG. 9 shows the relative light intensities and color coordinate differences of light beams in various colors of the splicing display apparatus 10' at different viewing angles in a first direction d1 in a comparative example. Curve R represents the relative light intensity of the red light beams of the splicing display apparatus 10' at different viewing angles in the first direction d1. Curve G represents the relative light intensity of the green light beams of the splicing display apparatus 10' at different viewing angles in the first direction d1. Curve B represents the relative light intensity of the blue light beams of the splicing display apparatus 10' at different viewing angles in the first direction d1. Bar Chart dx represents the differences in the x color coordinates of the splicing display apparatus 10' at different viewing angles in the first direction d1, and Bar Chart dy represents the differences in the y color coordinates of the splicing display apparatus 10' at different viewing angles in the first direction d1.

By comparing FIG. 6 with FIG. 8, and FIG. 7 with FIG. 9, it is known that, compared to the splicing display apparatus 10' in the comparative example, the splicing display apparatus 10 in an embodiment of the disclosure makes improvements in terms of asymmetrical light emission and reduces color casts at in-plane large viewing angles.

It must be noted that the same reference numbers and parts of the content from the previous embodiments are used in the following embodiments. The same numbers are adopted to refer to the same or similar elements, and descriptions of the same technical content are omitted. Reference may be made to the previous embodiments for the omitted descriptions, which will not be repeated in the following embodiments.

Figure 10:
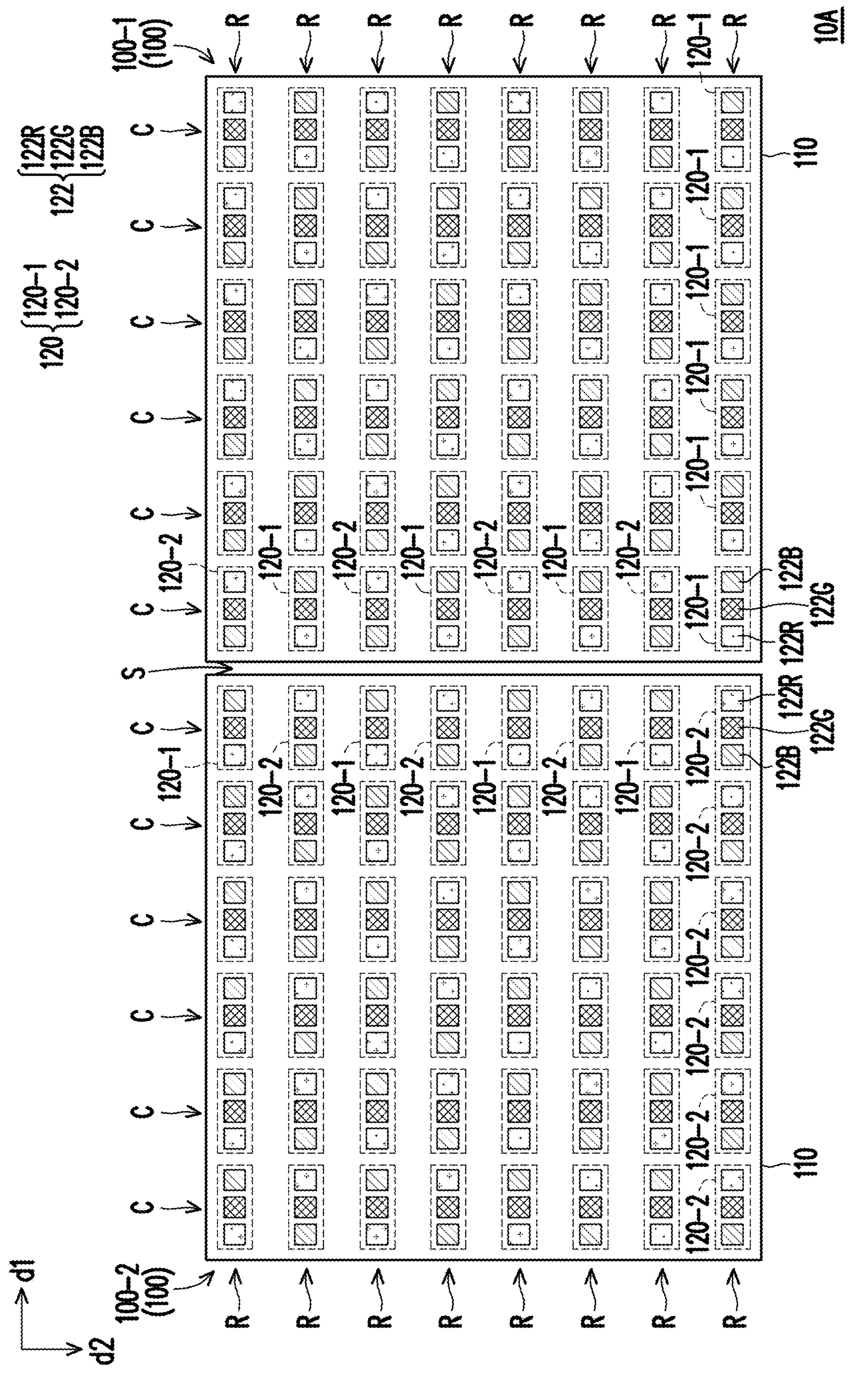
FIG. 10 is a schematic top view of a splicing display apparatus in another embodiment of the disclosure.

FIG. 10 is a schematic top view of a splicing display apparatus in another embodiment of the disclosure. A splicing display apparatus 10A in FIG. 10 is similar to the splicing display apparatus 10 in FIG. 1. The differences between the two are as follows. In the embodiment of FIG. 1, the pixel units 120 in each pixel unit row R are multiple first pixel units 120-1 and multiple second pixel units 120-2 alternately arranged in the first direction d1. That is, in the embodiment of FIG. 1, the same pixel unit row R includes various pixel units 120 that differ in the arrangement of the first light-emitting element 122R, the second light-emitting element 122B, and the third light-emitting element 122G. In the embodiment of FIG. 10, the pixel units 120 in each pixel unit row R are multiple first pixel units 120-1 or multiple second pixel units 120-2. That is, in the embodiment of FIG. 10, the first light-emitting element 122R, the second light-emitting element 122B, and the third light-emitting element 122G of all pixel units 120 in the same pixel unit row R are arranged in the same way.

Figure 11:
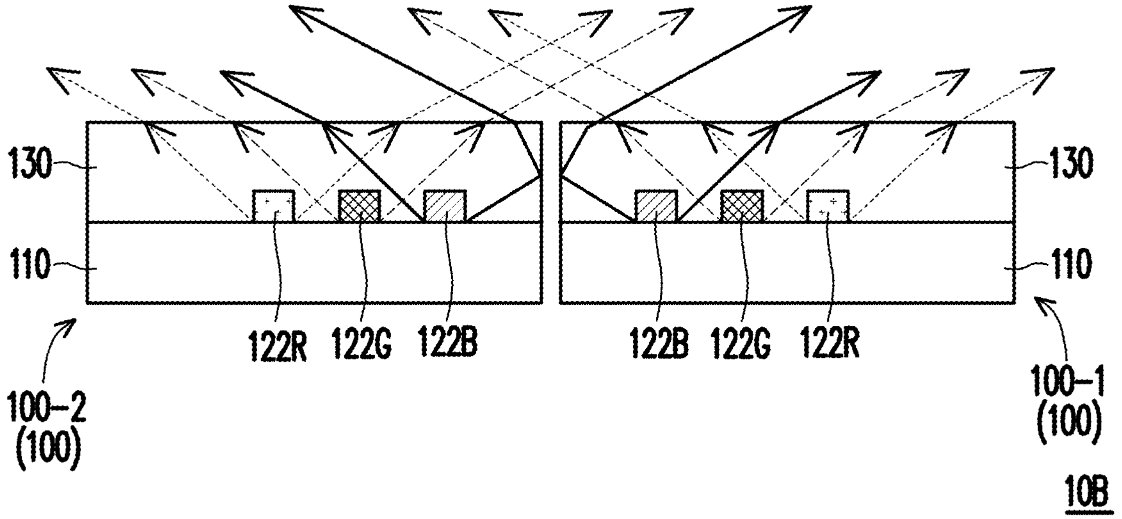
FIG. 11 is a schematic cross-sectional view of a splicing display apparatus in still another embodiment of the disclosure.

FIG. 11 is a schematic cross-sectional view of a splicing display apparatus in still another embodiment of the disclosure. A splicing display apparatus 10B in FIG. 11 is similar to the splicing display apparatus 10. The difference between the two is as follows. In the embodiment of FIG. 11, the disposition of the optical film 140 and the optical clear adhesive 150 may be omitted for each display panel 100.

What is claimed is:

1. A splicing display apparatus, comprising:
- a plurality of display panels, wherein each of the plurality of display panels comprises:
  - a circuit substrate; and
  - a plurality of pixel units, arranged in an array on the circuit substrate and electrically connected to the circuit substrate, wherein each of the plurality of pixel units comprises a plurality of light-emitting elements,
- wherein the plurality of display panels comprise a first display panel and a second display panel arranged in a first direction and spliced to each other, the first display panel and the second display panel having a splicing seam, wherein one of the pixel units of the first display panel closest to the splicing seam is substantially aligned in the first direction with one of the pixel units of the second display panel closest to the splicing seam;
- wherein the plurality of light-emitting elements of each of the plurality of pixel units comprise a first light-emitting element and a second light-emitting element for emitting a first color light and a second color light respectively;
- the first light-emitting element and the second light-emitting element of one of the pixel units of the first display panel closest to the splicing seam are sequentially arranged in the first direction; and the second light-emitting element and the first light-emitting element of one of the pixel units of the second display panel closest to the splicing seam are sequentially arranged in the first direction;
- the first direction intersects a second direction, the first display panel comprises a pixel unit column closest to the splicing seam, the pixel unit column of the first display panel comprises a plurality of pixel units sequentially arranged in the second direction, the first light-emitting element and the second light-emitting element of one of the plurality of pixel units in the pixel unit column of the first display panel is sequentially arranged in the first direction, and the first light-emitting element and the second light-emitting element of next one of the plurality of pixel units in the pixel unit column of the first display panel is sequentially arranged in a direction opposite to the first direction.

2. The splicing display apparatus according to claim 1, wherein the plurality of light-emitting elements of each of the plurality of pixel units further comprise a third light-emitting element for emitting a third color light; the first light-emitting element, the third light-emitting element, and the second light-emitting element of the pixel unit of the first display panel closest to the splicing seam are sequentially arranged in the first direction; and the second light-emitting element, the third light-emitting element, and the first light-emitting element of the pixel unit of the second display panel closest to the splicing seam are sequentially arranged in the first direction.

3. The splicing display apparatus according to claim 1, wherein the second display panel comprises a pixel unit column closest to the splicing seam, the pixel unit column of the second display panel comprises a plurality of pixel units arranged in the second direction, and the plurality of light-emitting elements of the plurality of pixel units in the pixel unit column of the second display panel closest to the splicing seam comprise a plurality of first light-emitting elements and a plurality of second light-emitting elements alternately arranged in the second direction, the plurality of first light-emitting elements of the first display panel being substantially aligned in the first direction with the plurality of first light-emitting elements of the second display panel respectively, and the plurality of second light-emitting elements of the first display panel being substantially aligned in the first direction with the plurality of second light-emitting elements of the second display panel respectively.

4. The splicing display apparatus according to claim 1, wherein the plurality of pixel units of each of the plurality of display panels comprise a plurality of first pixel units and a plurality of second pixel units; the first light-emitting element and the second light-emitting element of each of the plurality of first pixel units are sequentially arranged in the first direction; the second light-emitting element and the first light-emitting element of each of the plurality of second pixel units are sequentially arranged in the first direction; the first display panel comprises a pixel unit column closest to the splicing seam, and the plurality of first pixel units and the plurality of second pixel units in the pixel unit column of the first display panel are alternately arranged in a second direction intersecting the first direction; the second display panel comprises a pixel unit column closest to the splicing seam, and the plurality of first pixel units and the plurality of second pixel units in the pixel unit column of the second display panel are alternately arranged in the second direction; the plurality of first pixel units in the pixel unit column of the first display panel are substantially aligned in the first direction with the plurality of second pixel units in the pixel unit column of the second display panel respectively, and the plurality of second pixel units in the pixel unit column of the first display panel are substantially aligned in the first direction with the plurality of first pixel units in the pixel unit column of the second display panel respectively.

5. The splicing display apparatus according to claim 1, wherein the first color light is red light, and the second color light is blue light.

6. The splicing display apparatus according to claim 1, wherein the first color light is red light, the second color light is blue light, and the third color light is green light.

7. The splicing display apparatus according to claim 1, wherein each of the plurality of display panels further comprises an encapsulation layer disposed on the circuit substrate and covering the plurality of pixel units.

8. A splicing display apparatus, comprising:

a plurality of display panels, wherein each of the plurality of display panels comprises:
  a circuit substrate; and
  a plurality of pixel units, arranged in an array on the circuit substrate and electrically connected to the circuit substrate, wherein each of the plurality of pixel units comprises a plurality of light-emitting elements, wherein the plurality of display panels comprise a first display panel and a second display panel arranged in a first direction and spliced to each other, the first display panel and the second display panel having a splicing seam, wherein one of the pixel units of the first display panel closest to the splicing seam is substantially aligned in the first direction with one of the pixel units of the second display panel closest to the splicing seam;

wherein the plurality of light-emitting elements of each of the plurality of pixel units comprise a first light-emitting element and a second light-emitting element for emitting a first color light and a second color light respectively, the first direction intersects a second direction, the first display panel comprises a pixel unit column closest to the splicing seam, the pixel unit column of the first display panel comprises a plurality of pixel units sequentially arranged in the second direction, the first light-emitting element and the second light-emitting element of one of the plurality of pixel units in the pixel unit column of the first display panel is sequentially arranged in the first direction, and the first light-emitting element and the second light-emitting element of next one of the plurality of pixel units in the pixel unit column of the first display panel is sequentially arranged in a direction opposite to the first direction.

9. The splicing display apparatus according to claim 8, wherein the second display panel comprises a pixel unit column closest to the splicing seam, the pixel unit column of the second display panel comprises a plurality of pixel units arranged in the second direction, and the plurality of light-emitting elements of the plurality of pixel units in the pixel unit column of the second display panel closest to the splicing seam comprise a plurality of first light-emitting elements and a plurality of second light-emitting elements alternately arranged in the second direction, the plurality of first light-emitting elements of the first display panel being substantially aligned in the first direction with the plurality of first light-emitting elements of the second display panel respectively, and the plurality of second light-emitting elements of the first display panel being substantially aligned in the first direction with the plurality of second light-emitting elements of the second display panel respectively.

10. The splicing display apparatus according to claim 8, wherein the plurality of pixel units of each of the plurality of display panels comprise a plurality of first pixel units and a plurality of second pixel units; the first light-emitting element and the second light-emitting element of each of the plurality of first pixel units are sequentially arranged in the first direction; the second light-emitting element and the first light-emitting element of each of the plurality of second pixel units are sequentially arranged in the first direction; the first display panel comprises a pixel unit column closest to the splicing seam, and the plurality of first pixel units and the plurality of second pixel units in the pixel unit column of the first display panel are alternately arranged in a second direction intersecting the first direction; the second display panel comprises a pixel unit column closest to the splicing seam, and the plurality of first pixel units and the plurality of second pixel units in the pixel unit column of the second display panel are alternately arranged in the second direction; the plurality of first pixel units in the pixel unit column of the first display panel are substantially aligned in the first direction with the plurality of second pixel units in the pixel unit column of the second display panel respectively, and the plurality of second pixel units in the pixel unit column of the first display panel are substantially aligned in the first direction with the plurality of first pixel units in the pixel unit column of the second display panel respectively.

11. The splicing display apparatus according to claim 8, wherein the first color light is red light, and the second color light is blue light.

12. The splicing display apparatus according to claim 8, wherein each of the plurality of display panels further comprises an encapsulation layer disposed on the circuit substrate and covering the plurality of pixel units.

13. The splicing display apparatus according to claim 12, wherein the each of the plurality of display panels further comprises an optical film, the optical film is disposed on the encapsulation layer, and the plurality of pixel units are located between the optical film and the circuit substrate.

* * * * *